(12) United States Patent
Kim et al.

(10) Patent No.: US 12,115,886 B2
(45) Date of Patent: Oct. 15, 2024

(54) PRE-ACTIVE SAFETY SEAT SYSTEM FOR VEHICLE AND METHOD FOR IMPROVING PRE-ACTIVE SAFETY SEAT SPEED

(71) Applicants: HYUNDAI MOTOR COMPANY, Seoul (KR); Kia Corporation, Seoul (KR)

(72) Inventors: Hyung-Joo Kim, Busan (KR); Haeng-Kyeom Kim, Seoul (KR); Guk-Mu Park, Seoul (KR); Tae-Hoon Lee, Suwon-si (KR); Seung-Young Lee, Seoul (KR); Wook Jin, Seoul (KR); Eung-Man Kim, Hwaseong-si (KR); Dong-Woo Jeong, Gwacheon-si (KR); Ju-Yeol Kong, Ansan-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 483 days.

(21) Appl. No.: 17/387,324

(22) Filed: Jul. 28, 2021

(65) Prior Publication Data
US 2022/0305959 A1     Sep. 29, 2022

(30) Foreign Application Priority Data

Mar. 26, 2021  (KR) .................. 10-2021-0039649

(51) Int. Cl.
*B60K 28/14*     (2006.01)
*B60N 2/02*      (2006.01)
(Continued)

(52) U.S. Cl.
CPC ....... *B60N 2/0276* (2013.01); *B60N 2/02246* (2023.08); *B60N 2/10* (2013.01); *B60N 2/22* (2013.01); *B60N 2/0272* (2023.08)

(58) Field of Classification Search
CPC .... B60N 2/0276; B60N 2/02246; B60N 2/10; B60N 2/22; B60N 2/0272; B60R 21/013
See application file for complete search history.

(56) References Cited

U.S. PATENT DOCUMENTS

| 7,031,814 B2 * | 4/2006 | Kawato | B60R 21/013 |
| | | | 280/735 |
| 7,051,830 B2 * | 5/2006 | Enomoto | B60R 21/013 |
| | | | 180/274 |

(Continued)

FOREIGN PATENT DOCUMENTS

| KR | 10-2018-0020359 A | 2/2018 |
| KR | 10-2019-0140760 A | 12/2019 |
| KR | 10-2020-0030853 A | 3/2020 |

*Primary Examiner* — Gonzalo Laguarda
(74) *Attorney, Agent, or Firm* — Morgan, Lewis & Bockius LLP (57) ABSTRACT

A pre-active safety seat system applied to the vehicle implements a method for improving a pre-active safety seat speed, which confirms a risk region by matching a recline angle, a slide movement position, and a cushion tilt angle, which are detected from each of a plurality of sensors of a multi-seat sensor in a risk collision situation detected by a vehicle environment sensor of an ADAS, with a seat safety map, and combines and simultaneously controls a plurality of motors of a multi-seat motor configured for a seat target posture of a seat for converting the risk region into a safety region, by a controller, shortening a pre-active safety seat (PSS) required time of a seat target posture in the pre-active safety seat (PSS) operable section before collision of the vehicle from a risk detection.

17 Claims, 8 Drawing Sheets

(51) Int. Cl.
*B60N 2/10* (2006.01)
*B60N 2/22* (2006.01)

(56) References Cited

U.S. PATENT DOCUMENTS

| | | | | |
|---|---|---|---|---|
| 7,918,302 B2* | 4/2011 | Sakai | ............ | B60N 2/42727 |
| | | | | 180/274 |
| 8,393,667 B2* | 3/2013 | Hashimoto | ............ | B60N 2/4228 |
| | | | | 296/68.1 |
| 11,565,647 B2* | 1/2023 | Sakurai | ............ | B60R 21/013 |
| 2018/0053462 A1 | 2/2018 | Bae et al. | | |
| 2019/0378459 A1 | 12/2019 | Kim et al. | | |

* cited by examiner

PRE-ACTIVE SAFETY SEAT SYSTEM FOR VEHICLE AND METHOD FOR IMPROVING PRE-ACTIVE SAFETY SEAT SPEED

CROSS-REFERENCE TO RELATED APPLICATION

The present application claims priority to Korean Patent Application No. 10-2021-0039649, filed on Mar. 26, 2021, the entire contents of which is incorporated herein for all purposes by this reference.

BACKGROUND OF THE PRESENT INVENTION

Field of the Invention

The present invention relates to a pre-active safety seat system for a vehicle, and particularly, to a method for improving a pre-active safety seat speed of a vehicle using a pre-active safety seat system in which a pre-active safety seat (PSS) required time required at the time of detecting a vehicle collision risk is earlier by performance of a plurality of motors.

Description of Related Art

Recently, a pre-active safety seat (PSS) for protecting passengers due to vehicle collision is applied.

As an example, the pre-active safety seat (PSS) is a method for predicting collision by detecting a collision risk of an advanced driver assistance system (ADAS) environment sensor, and in response thereto, changing a seat posture to reduce injury to a passenger in an abnormal posture outside response ranges of a seatbelt and an airbag.

To the present end, the pre-active safety seat (PSS) utilizes a seat motor to control a current seat posture to a target posture, and rapidly changes an unstable position of a current posture backrest up to an angle of a safe target posture backrest by performance of the seat motor.

Therefore, the pre-active safety seat (PSS) may improve passenger safety from the collision risk in which serious injuries may be caused despite the response using the seatbelt and the airbag, as in a case where a collision speed is high, the seat position is positioned on the rear, or the seat backrest is reclined back upon collision.

However, a PSS required time required in the pre-active safety seat (PSS) is determined by a difference between the current and target postures of the seat and the performance of the seat motor but set by only the performance of the motor such that it may be difficult to implement sufficient performance according to collision situations.

As an example, if a motor speed is A°/sec, a B sec is required as a required time to rapidly change an angle of the target posture backrest into Y° by setting an angle of the current posture backrest as X°. In a Dl, A and B are values capable of achieving the passenger's safety in the collision situations of the general vehicle, and regions of X and Y as the scopes of changing the backrest angle of the general seat mean a state where X° is reclined back more than Y°.

Therefore, when the collision risk detection timing is late through the ADAS environment sensor when the preceding vehicle suddenly stops or has an accident, a seat posture change time is shorter than the PSS required time even under the pre-active safety seat (PSS) such that it is inevitably impossible to secure the safety posture.

A case where only a recline motor itself is used for each control of the seat backrest of the pre-active safety seat (PSS) even in the thus measured collision situation inevitably has large difficulty in enhancing robustness for the unexpected accident.

The information disclosed in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing an pre-active safety seat system for a vehicle and a method for improving a pre safety seat speed, which apply a multi-seat motor including a plurality of motors for individually controlling a recline angle, a sliding position, and a tilt angle to a seat, and control all of a recline angle of a seatback, a sliding position of a seat cushion, a tilt angle of the seat cushion by a multi-seat motor in a vehicle collision risk detection situation, shortening a pre-active safety seat (PSS) required time for changing the seat from a risky posture into a safety posture in the pre-active safety seat (PSS) operable section before collision from risk detection.

A pre safety seat system for a vehicle according to various exemplary embodiments of the present invention for achieving the object includes a vehicle environment sensor configured for detecting risk collision situation information for a neighboring vehicle while a driver's vehicle travels, a multi-seat sensor configured for detecting one or more of a recline angle, a slide movement position, and a cushion tilt angle as a current seat posture of a seat, a multi-seat motor configured for generating a motor driving force such that the current seat posture of the seat is changed into a seat target posture by changing one or more of the recline angle, the slide movement position, and the cushion tilt angle, and a controller electrically connected to the vehicle environment sensor, the multi-seat sensor and the multi-seat motor and configured for controlling the motor driving force to adjust the current seat posture of the seat up to the seat target posture in a risk collision situation confirmed by the controller according to the risk collision situation information.

As various exemplary embodiments of the present invention, the vehicle environment sensor is a component of an advanced driver assistance system (ADAS).

As the exemplary embodiment of the present invention, the multi-seat sensor is mounted on the seat, and includes a recline sensor to detect the recline angle, a slide sensor to detect the slide movement position, and a tilt sensor to detect the cushion tilt angle of the seat cushion with respect to the seatback.

As the exemplary embodiment of the present invention, the recline sensor is mounted on a seatback of the seat, the slide sensor is mounted on a seat cushion of the seat, and the tilt sensor is mounted on a connection portion of the seat cushion and the seatback.

As the exemplary embodiment of the present invention, the multi-seat motor is mounted on the seat, and includes a recline motor configured for increasing and decreasing the recline angle, a slide motor configured for changing the slide movement position, and a tilt motor configured for increasing and decreasing the cushion tilt angle.

As the exemplary embodiment of the present invention, the recline motor is mounted on a seatback of the seat, the slide motor is mounted on a seat cushion of the seat, and the tilt motor is mounted on a hinge connection portion of the seat cushion and the seatback.

As the exemplary embodiment of the present invention, the recline motor, the slide motor, and the tilt motor are a step motor.

As the exemplary embodiment of the present invention, the controller is connected to a seat safety map which includes a risk region and a safety region by a backrest angle and a tilt angle of the seat, and the risk region is applied as a matching section in which the current seat posture is required to be changed into the seat target posture.

As the exemplary embodiment of the present invention, the controller is configured to match the cushion tilt angle with the tilt angle while matching the recline angle according to the slide movement position with the backrest angle, and generates a motor output changed from the current seat posture into the seat target posture as a result of the matching.

As the exemplary embodiment of the present invention, the controller is configured to classify the motor output into a recline motor output for changing the recline angle, a slide motor output for changing the slide movement position, and a tilt motor output for changing the cushion tilt angle.

As the exemplary embodiment of the present invention, the controller simultaneously transmits the recline motor output and the slide motor output to the multi-seat motor, shortening a PSS required time of the seat target posture in a PSS operable section before collision of the vehicle from a risk detection.

Furthermore, a method for improving a pre safety seat speed according to various exemplary embodiments of the present invention for achieving the object includes confirming, by a controller, a collision risk situation for a neighboring vehicle detected by an ADAS while a vehicle travels, matching a map which confirms a current seat posture of a seat by matching one or more of a recline angle, a slide movement position, and a cushion tilt angle of the seat detected by a multi-seat sensor provided on the seat with a seat safety map, and confirms the current seat posture as a risk region, determining a change in one or more of the recline angle, the slide movement position, and the cushion tilt angle, and driving a multi-seat motor which is electrically connected to the controller and changes the current seat posture into a seat target posture of a safety region by controlling driving of the multi-seat motor provided on the seat, in a PSS operable section before collision of the vehicle from a risk detection.

As various exemplary embodiments of the present invention, with respect to the seat target posture, the controller sets a posture of a safety region closest to the current posture found by analyzing the seat safety map in a case where it is confirmed that the current seat posture belongs to the risk region as a target posture.

As the exemplary embodiment of the present invention, the matching of the map includes matching the recline angle according to the slide movement position with a backrest angle of the seat safety map, and confirming the risk region and the safety region for the current seat posture as a result of the matching the cushion tilt angle to a tilt angle of the seat safety map.

As the exemplary embodiment of the present invention, the driving of the multi-seat motor includes adjusting a seatback angle which changes a tilt angle of the recline angle, moving a position of a seat cushion which moves the slide movement position, and adjusting a seat cushion tilt which changes a height of the cushion tilt angle.

As the exemplary embodiment of the present invention, the adjusting of the seatback angle and the moving of the position of the seat cushion are simultaneously controlled, shortening a PSS required time of the seat target posture.

As the exemplary embodiment of the present invention, the adjusting of the seatback angle includes confirming whether the recline angle does not satisfy a target value for the safety region, and changing a tilt angle of the recline angle by driving a recline motor provided on the seat.

As the exemplary embodiment of the present invention, the moving of the position of the seat cushion includes confirming whether the slide movement position does not satisfy a target value for the safety region, and moving the slide movement position by driving a slide motor provided on the seat.

As the exemplary embodiment of the present invention, the adjusting of the seat cushion tilt includes confirming whether the cushion tilt angle does not satisfy a target value for the safety region, and changing a tilt angle of the cushion tilt angle by driving a tilt motor provided on the seat.

The pre-active safety seat system through the improvement in the pre-active safety seat speed of the vehicle according to various exemplary embodiments of the present invention implements the following operations and effects.

First, by applying the multi-seat motor including three independent motors for controlling each of the recline angle, slide position, and tilt angle of the seat, it is possible to enhance the performance of the seat motor determining the pre-active safety seat (PSS) required time together with the difference between the current and target postures of the seat. Second, the multi-seat motor having enhanced performance of the seat motor controls the recline angle, the slide position, and the tilt angle together at the collision risk detection timing such that the PSS required time is earlier by improving the PSS speed. Third, the control of the tilt angle is additionally changed by the tilt motor in the state where the control of the recline angle of the seat is changed by simultaneously driving the recline motor and the slide motor, further improving the performance of the PSS speed improvement. Fourth, the collision risk detection timing may be sufficiently changed up to the safety region at the latest by improving the PSS speed, improving robustness of the PSS technology. Fifth, it is possible to delay the starting time of the PSS operation even if the collision risk detection timing is the same by improving the PSS speed, minimizing the consumer's complaint due to the frequent operation.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, of the present invention an exemplary embodiment of the present invention will be described in detail with reference to accompanying exemplary drawings, and the exemplary embodiment of the present invention is illustrative and may be implemented by those skilled in the art to which various exemplary embodiments of the present invention pertains in various different forms, and thus is not limited to the exemplary embodiment described herein.

Figure 1:
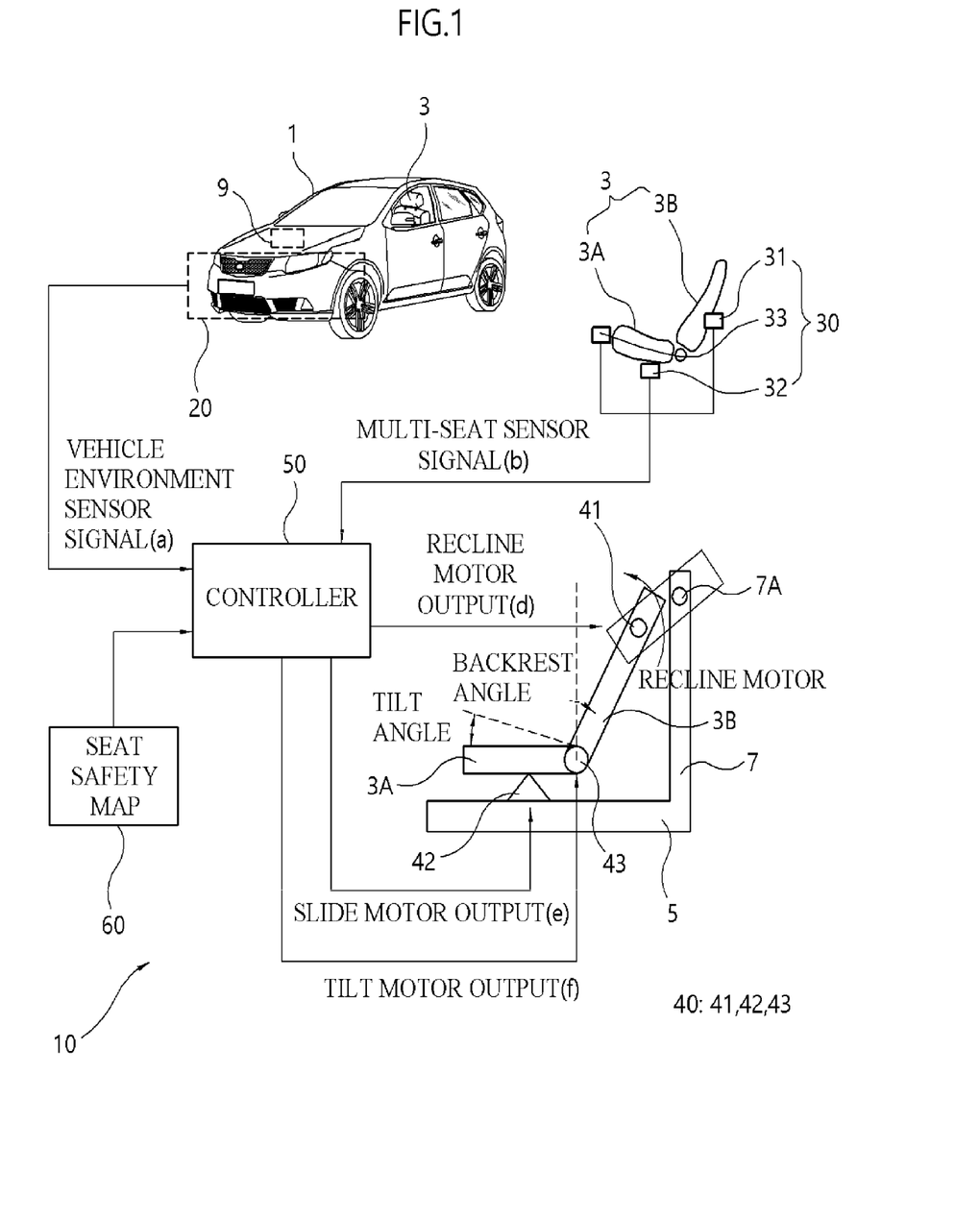
FIG. 1 is a diagram illustrating a configuration of a pre-active safety seat system applied to a vehicle according to various exemplary embodiments of the present invention.
Figure 2:
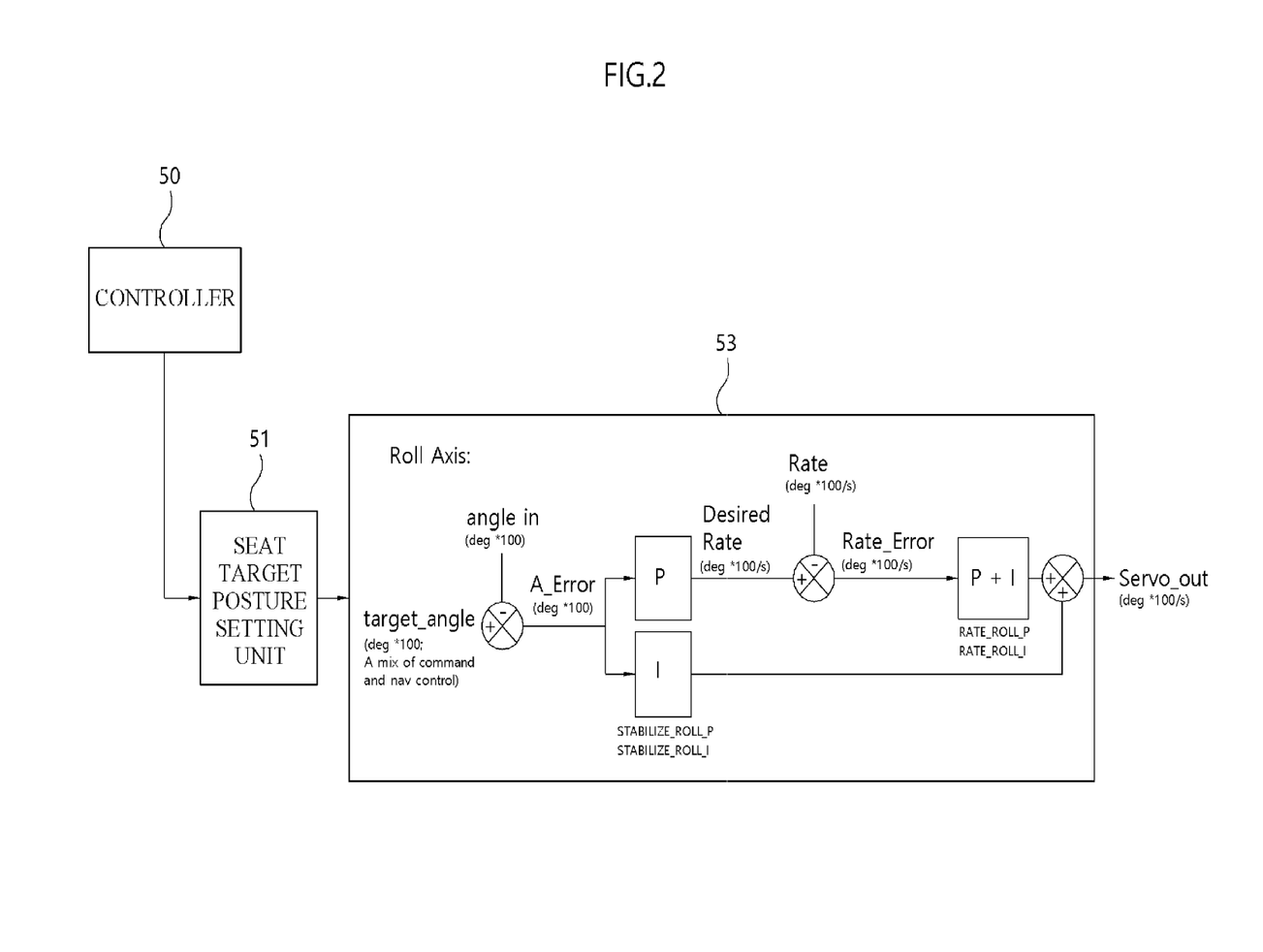
FIG. 2 is a diagram illustrating a configuration of a controller of the pre-active safety seat system according to various exemplary embodiments of the present invention.

FIG. 1 and FIG. 2 illustrate a vehicle 1 to which a pre-active safety seat system 10 is applied.

Referring to FIG. 1, the pre-active safety seat system 10 is applied to a seat 3, and the seat 3 includes a seat cushion 3A on which a driver or a passenger sits and a seatback 3B for supporting a driver or passenger's back.

However, there is a difference in that the seat 3 is connected to the pre-active safety seat system 10 such that a position of the seat cushion 3A is moved by a sliding movement according to a floor panel 5 to use a tilt angle as a cushion tilt to form the upward and downward movements, and the seatback 3B is positioned in the middle portion of front/rear doors of the vehicle 1 to form the reclined movement at a backrest angle in the front and rear directions with respect to a B pillar 7 mounted with a seatbelt anchor 7A.

The sliding movement of the seat cushion 3A is connected to a slide motor 42, the cushion tilt of the seat cushion 3A is connected to a tilt motor 43, and the recline slope of the seatback 3B is connected to a recline motor 41.

As an example, the pre-active safety seat system 10 includes an pre-active safety seat system which improves a PSS speed in a pre-active safety seat (PSS) required time by multi-degree of freedom seat mechanism applying a multi-seat sensor 30 and the multi-seat motor 40 to the seat 3.

To the present end, the pre-active safety seat system 10 includes a vehicle environment sensor 20, the multi-seat sensor 30, the multi-seat motor 40, a controller 50, and a seat safety map 60.

The vehicle environment sensor 20 is one of various types of sensors forming an advanced driver assistance system 9 for the vehicle 1. In the instant case, the ADAS 9 as a three-dimensional type provides classification of lanes and target point types, determination of road types, and current traveling lanes and behaviors of neighboring vehicles in connection to a map database using a light detection and range (LiDAR) configured for measuring a position coordinate of a reflector by measuring a time to shoot the light and return after reflection, a camera for photographing road information as videos, and the like.

Therefore, the vehicle environment sensor 20 is the same as the sensor applied to the ADAS 9.

The multi-seat sensor 30 includes three components: a recline sensor 31, a slide sensor 32, and a tilt sensor 33 and provided on the seat 3 in one pair.

As an example, the recline sensor 31 detects a change in a backrest angle with respect to the seatback 3B as a recline tilt angle to provide it to the controller 50, the slide sensor 32 detects a sliding movement distance of the seat cushion 3A moved on the floor panel 5 to provide it to the controller 50, and the tilt sensor 33 is mounted on a hinge connection portion of the seat cushion 3A and the seatback 3B to detect a tilt angle of the seat cushion 3A tilted with respect to the seatback 3B as the cushion tilt to provide it to the controller 50.

The multi-seat motor 40 includes three components: a recline motor 41, a slide motor 42, and a tilt motor 43 and provided on the seat 3 in one pair. In the instant case, each of the motors 41, 42, 43 preferably utilizes a step motor configured for easily adjusting an RPM of the motor.

Each of the recline motor 41, the slide motor 42, and the tilt motor 43 forms a pair of rack and pinion gears together, by use of a rotation force of the motor to adjust a recline tilt angle, a cushion tilt angle, and a slide movement distance.

As an example, the recline motor 41 is mounted on the seatback 3B of the seat 3, and generates the rotation force of the motor to move the seatback 3B to be close to or away from the B pillar 7, changing the recline tilt angle in the front and rear directions by a change in a backrest angle. The slide motor 42 is mounted on the seat cushion 3A of the seat 3, and generates the rotation force of the motor to move the seat cushion 3A with respect to the floor panel 5 to change the sliding position in the front and rear directions (i.e., front and rear directions of the vehicle) by a change in the movement position of the seat cushion 3A. The tilt motor 43 is mounted on the hinge connection portion of the seat cushion 3A and the seatback 3B of the seat 3, and generates the rotation force of the motor to move the seat cushion 3A upward or downward with respect to the seatback 3B, increasing or decreasing the cushion tilt angle by a change in a height tilt angle of the seat cushion 3A.

To the present end, the recline motor 41 and the tilt motor 43 deliver the rotation forces of the motor to the seatback 3B of the seat 3 by rotation gears (e.g., a spur gear, a bevel bear, a helical gear, or a worm/a worm gear), and the slide motor 42 delivers the rotation forces of the motor to the seat cushion 3A of the seat 3 through linear conversion gear (e.g., rack/pinion gears).

Therefore, the multi-seat sensor 30 of the recline sensor 31, the slide sensor 32, and the tilt sensor 33, and the multi-seat motor 40 of the recline motor 41, the slide motor 42, and the tilt motor 43 form the multi-degree of freedom seat mechanism for the seat 3.

Therefore, the multi-degree of freedom seat mechanism also includes the degree of freedom determining the seat posture other than recline/slide/cushion tilt by expressing the current posture of the seat with the recline angle, the slide position, and the cushion tilt angle. Therefore, the multi-degree of freedom seat mechanism may largely enhance performance of the seat motor determining the pre-active safety seat (PSS) required time together with a difference between the current and target postures of the seat 3 in a collision risk situation of the vehicle 1.

When a risk signal detected by the vehicle environment sensor 20 is transmitted, the controller 50 as a PSS controller controls a motor voltage or current for each of the multi-seat motor 40 to change the current seat posture of the seat 3 detected by the multi-seat sensor 30 into the target posture provided by the seat safety map 60.

To the present end, the controller 50 receives a vehicle environment sensor signal (a) and a multi-seat sensor signal (b) as control data, outputs a recline motor output (d), a slide motor output (e), and a tilt motor output (f) as driving data, and is provided with a memory for storing a logic for performing a control of improving the pre-active safety seat speed (see FIG. 4) as a program to operate as a central processing unit.

The seat safety map 60 as a database (DB) forming collision test results for each seat posture of the seat 3 includes a line diagram of a backrest angle (X)—a tilt angle (Y) of the seat 3 in which a seat posture condition includes a safety region and a risk region through analysis for the database (DB).

The line diagram of the backrest angle (X)—the tilt angle (Y) is provided as a matching map for the detected recline angle (i.e., backrest angle (X)) of the seatback 3B and the cushion tilt angle (i.e., tilt angel (Y)) of the seat cushion 3A.

Referring to FIG. 2, the controller 50 may be constituted to include a seat target posture setting unit 51 and a seat motor driving control unit 53.

As an example, the seat target posture setting unit 51 matches the recline angle of the seatback 3B and the cushion tilt angle of the seat cushion 3A, which are detected, with the line diagram of the backrest angle (X)—the tilt angle (Y) of the seat safety map 60, and sets the seat target posture by extracting the difference between the current and target postures of the seat 3 with the matched result.

As an example, the seat motor driving control unit 53 controls the motor voltage or current for each of the motors 41, 42, 43 of the multi-seat motor 40 using a P and an I of a PID control. In the instant case, the PID means proportional (P), integral (I), derivative (D).

The seat motor driving control unit 53 controls each motor voltage until the current seat posture is changed to the target posture upon driving for each of the motors 41, 42, 43.

Meanwhile, FIGS. 3 to 8 illustrate a state where the current posture of the seat 3 is changed into the seat target posture in the risk collision situation of the vehicle 1 by the method for improving the pre safety seat speed of the pre safety seat system 10. In the instant case, a control subject is the controller 50, and a control object is each of the recline motor 41, the slide motor 42, and the tilt motor 43 forming the multi-seat motor 40.

Figure 3:
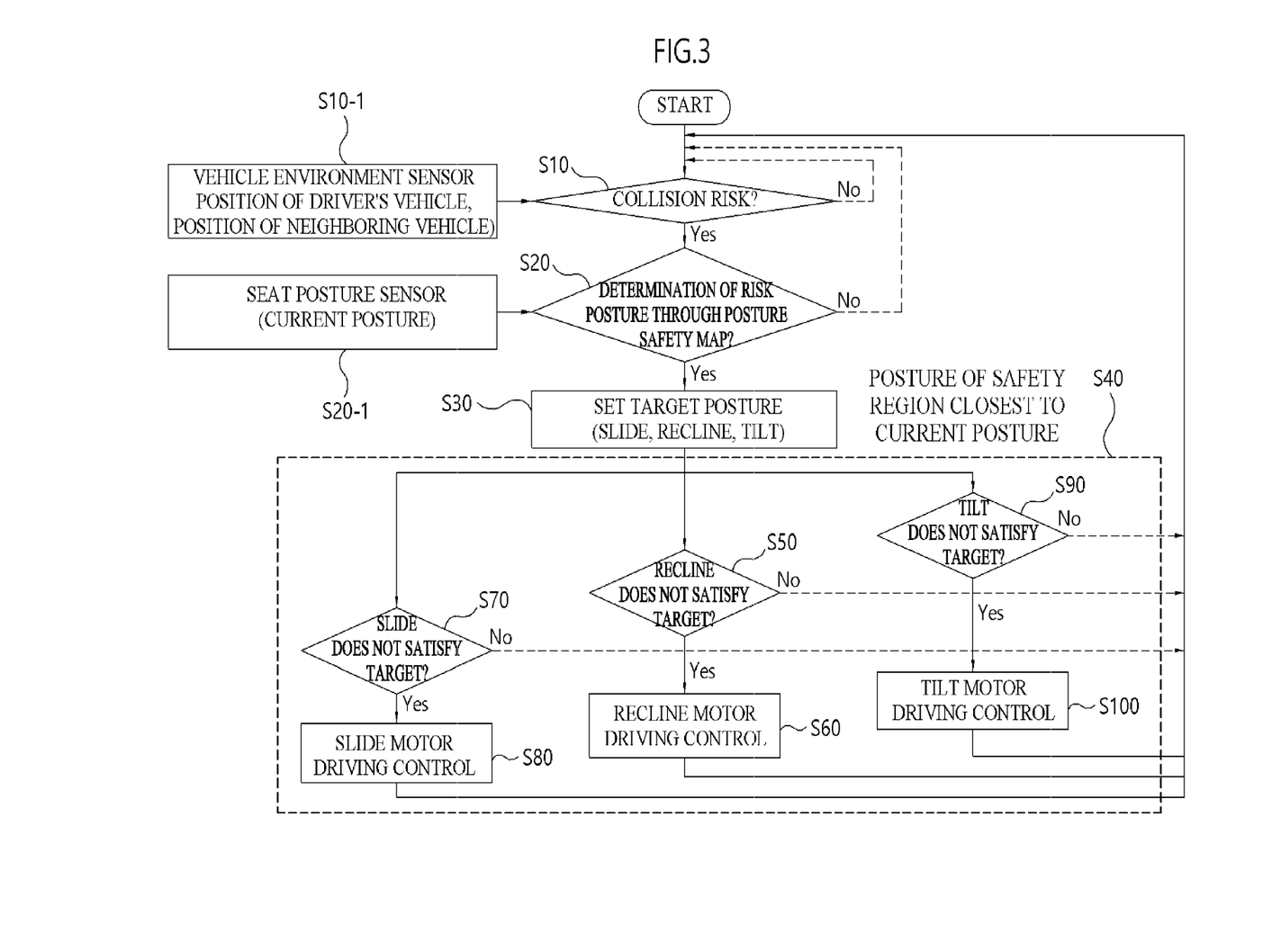
FIG. 3 is a flowchart of a method for improving a pre-active safety seat speed using the pre-active safety seat system for the vehicle according to various exemplary embodiments of the present invention.

Referring to FIG. 3, the controller 50 performs recognizing a collision risk (S10), confirming a map matching seat posture risk degree (S20), confirming a seat target posture (S30), and driving a multi-seat motor (S40) for the method for improving the pre safety seat speed.

As an example, the recognizing of the collision risk (S10) confirms the degree of the collision risk between a driver's vehicle and neighboring vehicles from information related to the neighboring vehicles generated in detecting vehicle environment sensor information (S10-1).

Figure 4:
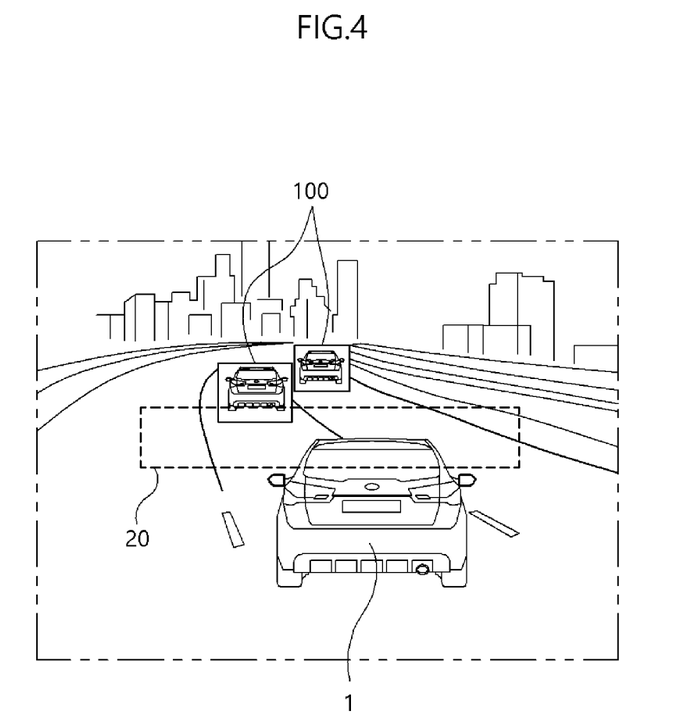
FIG. 4 is a diagram illustrating a state where the vehicle according to various exemplary embodiments of the present invention detects a neighboring vehicle by a vehicle environment sensor of an ADAS.

Referring to FIGS. 1 and 4, the vehicle environment sensor 20 performs the detecting of the vehicle environment sensor information (S10-1) by detecting a preceding vehicle 100 traveling in the front and rear and left and right directions of the vehicle 1 (vehicle 1 during traveling) with neighboring vehicle position information, and the controller 50 confirms a position of the driver's vehicle, positions of the neighboring vehicles, and an inter-vehicle distance from the neighboring vehicle position information transmitted by the vehicle environment sensor 20 using Global Positioning System (GPS) information, as necessary. In the instant case, the neighboring vehicle position information of the vehicle environment sensor 20 includes a distance from a collision object, a relative speed, and an acceleration, and the information may be delivered using a controller area network (CAN), a Bluetooth, or wireless communication.

Figure 5:
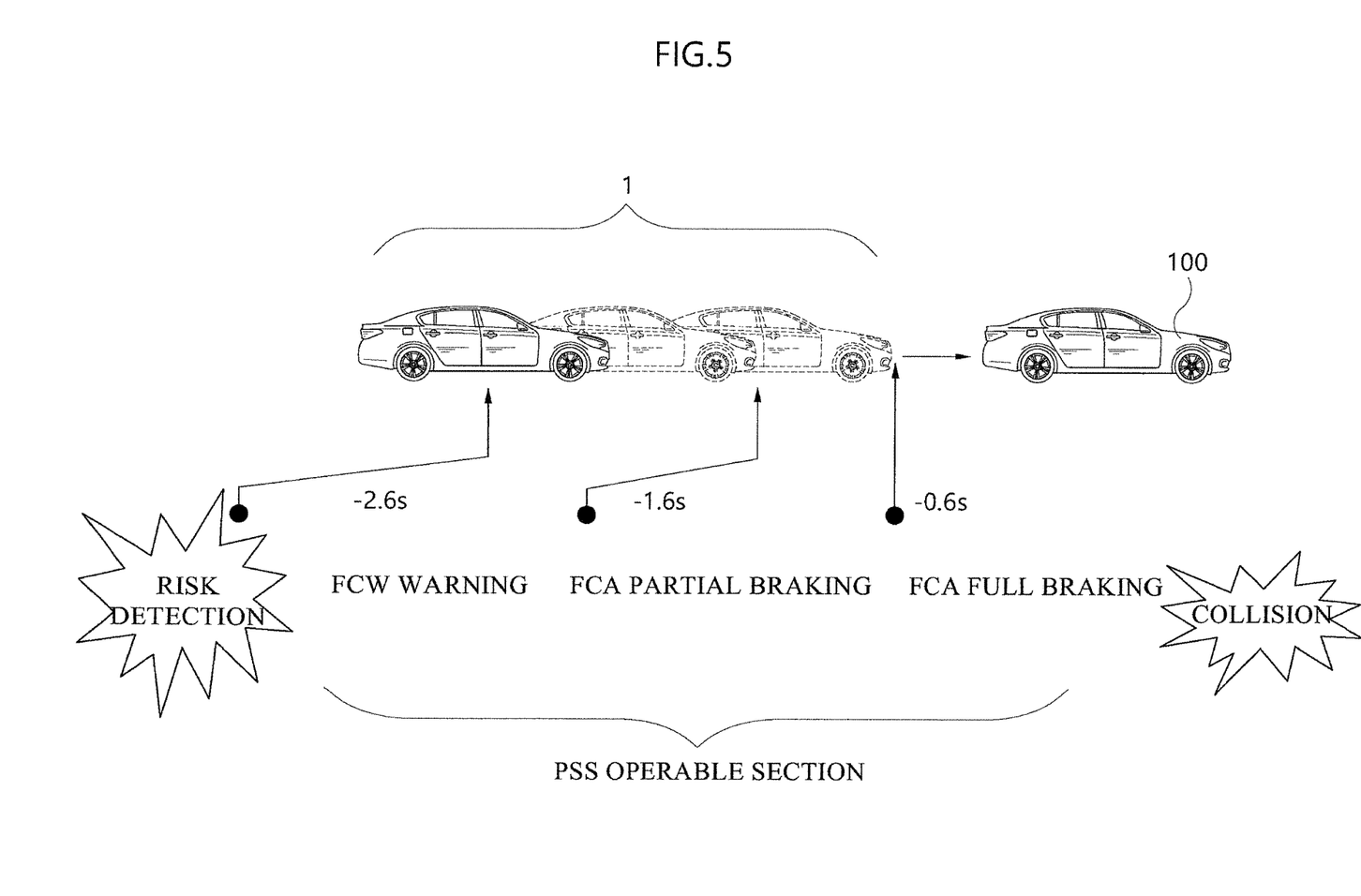
FIG. 5 is a diagram illustrating an example of a PSS required time of the pre-active safety seat system in an ADAS operation state of a collision risk situation according to various exemplary embodiments of the present invention.

Referring to FIG. 5, the controller 50 confirms collision risk by classifying collision risk detection classified by a collision risk logic (e.g., a lateral collision-avoidance assist (LCA) and/or a backward collision-avoidance assist (BCA)) into a frontal collision warning (FCW) and a frontal collision-avoidance assist (FCA) using the inter vehicle distance.

Therefore, the controller 50 sets partial braking and full braking processes of the FCA in the collision warning of the FCW as a PSS operable section.

As an example, the confirming of the map matching seat posture risk (S20) confirms the seat target posture from current seat posture information for the seat 3 of the vehicle 1 generated in detecting multi-seat sensor information (S20-1).

Referring to FIG. 1, the multi-seat sensor 30 detects the recline tilt angle for the seatback 3B of the recline sensor 31, the sliding movement distance for the seat cushion 3A of the slide sensor 32, and the cushion tilt angle for the seat cushion 3A of the tilt sensor 33, and provides these detection values to the controller 50 through the CAN.

Accordingly, the controller 50 utilizes the detection values of the recline tilt angle, sliding movement distance, and cushion tilt angle for the seat 3 as seat position current information, and confirms whether the seat 3 is in the safety region state or the risk region state by matching the seat position current information with the seat safety map 60.

As an example, the confirming of the seat target posture (S30) confirms the seat target posture in the current seat posture with the recline tilt angle, the sliding movement distance, and the cushion tilt angle of the seat 3 in the current state (i.e., collision risk situation).

Referring to FIG. 2, the controller 50 performs the matching between the seat target posture setting unit 51 and the seat safety map 60 for confirming the seat target posture.

Figure 6:
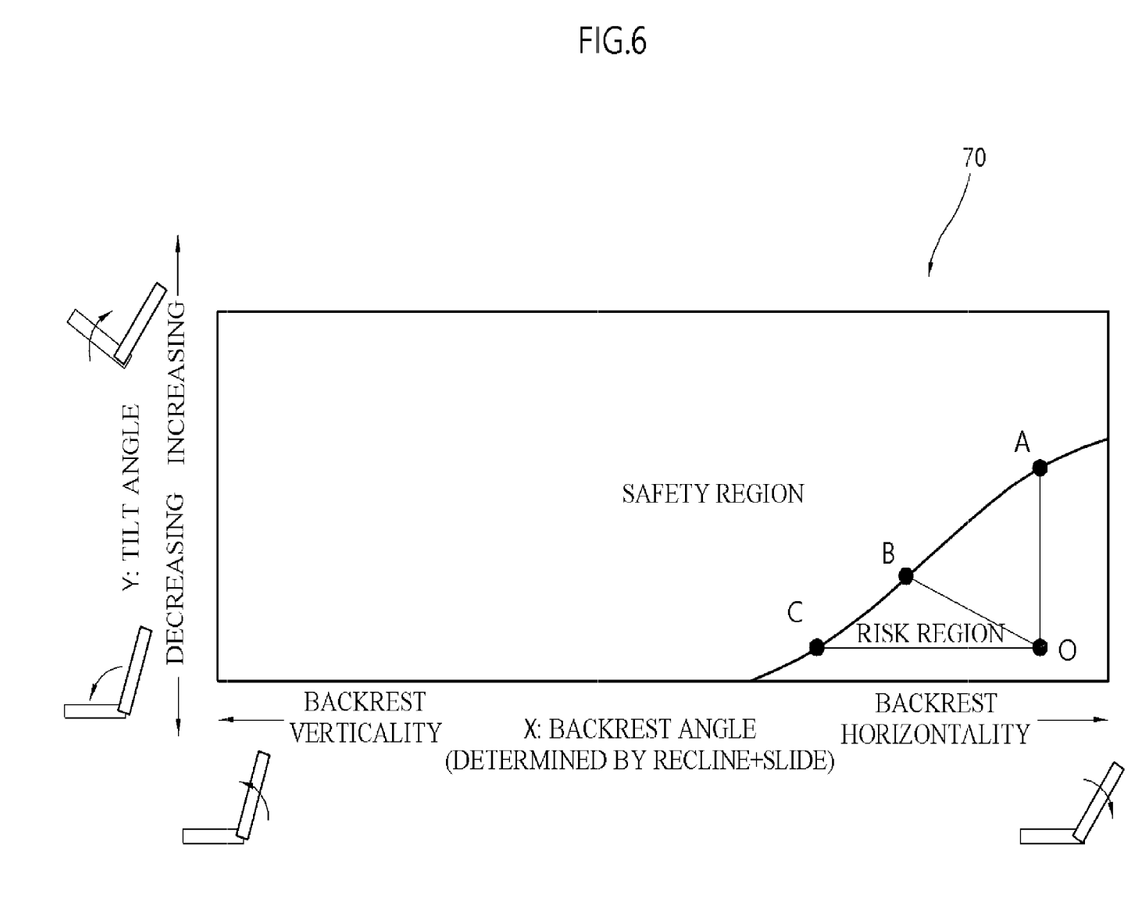
FIG. 6 is a diagram illustrating an example in which the pre-active safety seat system for the vehicle according to various exemplary embodiments of the present invention confirms a seat target posture through a seat safety map constructed by DB.

Referring to FIG. 6, the seat safety map 60 is constituted such that occurrence/non-occurrence of a submarine include the risk region and the safety region with respect to the seat posture according to the recliner, slide, and cushion tilt degree of freedom of the seat 3, which is expressed by the line diagram of the backrest angle (X)—the tilt angle (Y). In the instant case, the risk/safety regions are determined by the collision test or analysis result data for each posture for the seat 3.

As an example, data mapping processing of the seat safety map 60 for obtaining the seat target posture and the pre-active safety seat (PSS) required time in the collision risk situation is as follows.

First, when the target posture candidates of the safety region for a posture "O" belonging to the current seat risk region are assumed as "A", "B", and "C", "A" may be matched as a situation of being moved to the safety region by adjusting only the cushion tilt angle in the current posture, "B" may be matched as a situation of being moved to the safety region by simultaneously adjusting the cushion tilt angle and the backrest angle in the current posture, and "C" may be matched as a situation of being moved to the safety region by adjusting only the backrest angle in the current posture.

Accordingly, the PSS required time required for implementing the seat target posture with respect to any one of "A", "B", and "C" in the "0" posture may be extracted as follows. In the instant case, a "tilt A" means a tilt angle of an A posture, a "V_recline" means an operation speed of the recline motor 41, a "V_slide" means an operation speed of the slide motor 42, a "V_tilt" means an operation speed of the tilt motor 43, and the motor speed means revolutions per minute (RPM), which is the number of rotations of the motor.

(1) Equation of determining the PSS required time when "O" is changed into "A"

$$\Delta T\_A = (\text{tilt}\_A - \text{tilt}\_O)/V\_\text{tilt}$$

(2) Equation of determining the PSS required time when "O" is changed into "B"

$$\Delta T\_B = \max\{(\text{backrest angle}\_B - \text{backrest angle}\_O0)/(V\_\text{slide} + V\_\text{recline}), (\text{tilt}\_B - \text{tilt}\_O)/(V\_\text{tilt})\}$$

(2) Equation of determining the PSS required time when "0" is changed into "C"

$$\Delta T\_C = (\text{backrest angle}\_C - \text{backrest}\_O)/(V\_\text{slide} + V\_\text{recline})$$

Therefore, "ΔT_A/ΔT_B/ΔT_C" is the relation of "ΔT_B<ΔT_C" and "ΔT_B<ΔT_A" such that it may be seen that an operation time of the motor is minimum when the posture of "O" is changed into the posture of "B".

Therefore, it is possible to first approach the seat target posture by minimizing the PSS required time by a simultaneous driving control of the recline motor 41 and the slide motor 42 like "ΔT_B" in the risk collision situation, and then to finally reach the seat target posture by controlling the driving of the tilt motor 43.

As an example, the driving of the multi-seat motor (S40) includes adjusting a seatback angle (S50, S60), moving a position of a seat cushion (S70, S80), and adjusting a seat cushion tilt (S90, S100).

The controller 50 simultaneously controls the adjusting of the seatback angle (S50, S60) and the moving of the position of the seat cushion (S70, S80) according to "ΔT_B" for minimizing the PSS required time as described with reference to FIG. 6 in the adjusting of the seatback angle (S50, S60), the moving of the position of the seat cushion (S70, S80), and the adjusting of the seat cushion tilt (S90, S100), driving the recline motor 41 and the slide motor 42 forming the multi-seat motor 40 together.

Therefore, the driving of the recline motor 41, the slide motor 42, and the tilt motor 43 forming the multi-seat motor 40 may be controlled individually one by one, or by two combinations or three combinations to be changed into the posture of the safety region closest to the current posture of the seat 3.

The adjusting of the seatback angle (S50, S60) includes confirming whether the recline does not satisfy a target (S50) and performing a recline motor driving control (S60). The moving of the position of the seat cushion (S70, S80) includes confirming whether a slide does not satisfy the target (S70) and performing a slide motor driving control (S80). In the instant case, the confirming whether the recline does not satisfy the target (S50) and the confirming whether the slide does not satisfy the target (S70) are values confirmed from the matched result through the seat safety map 60 illustrated in FIG. 6.

Figure 7:
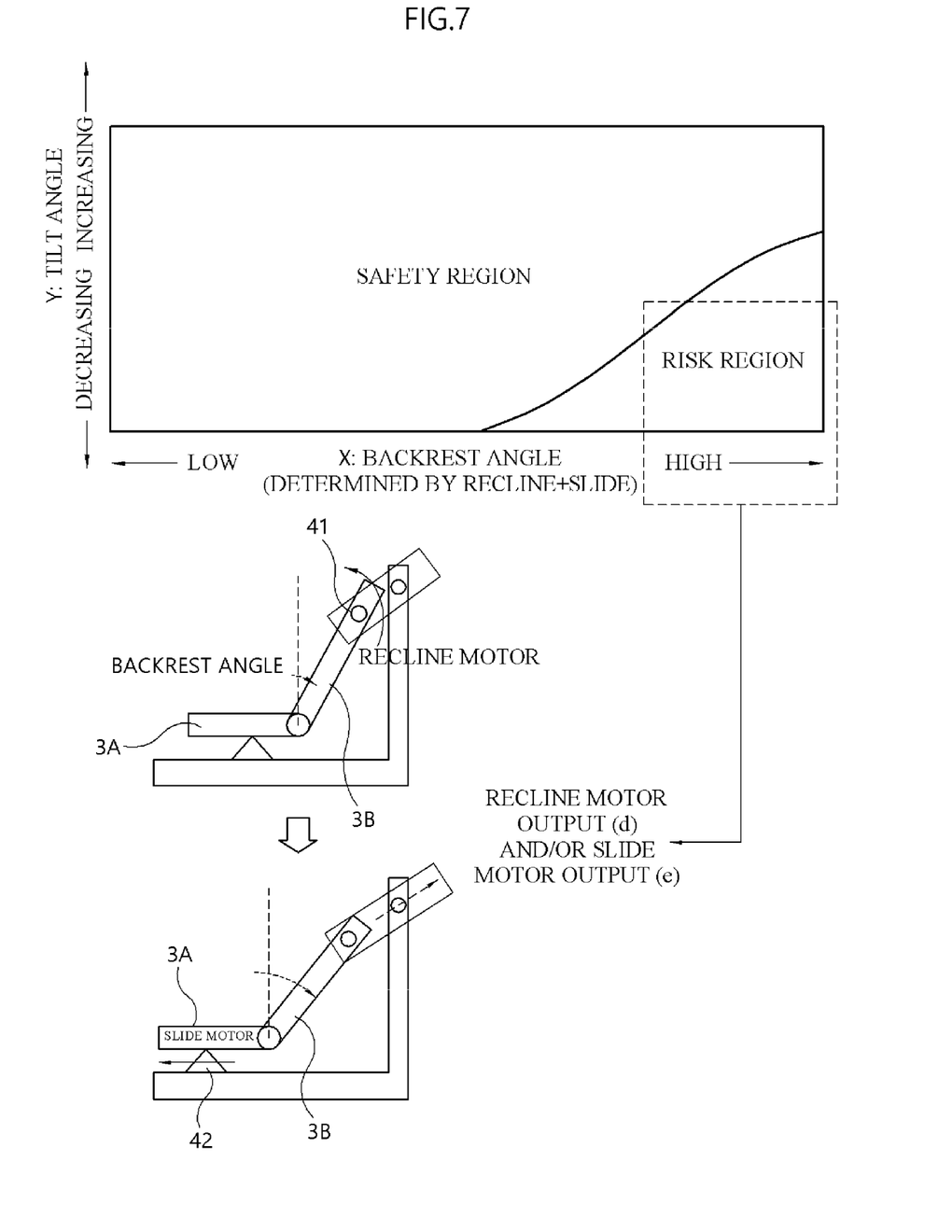
FIG. 7 is a diagram illustrating seatback recline angle change and cushion position movement states where the pre safety seat using a recline motor and a slide motor is performed in the PSS required time according to various exemplary embodiments of the present invention.

FIG. 7 illustrates that the controller 50 simultaneously performs the adjusting of the seatback angle (S50, S60) and the moving of the position of the seat cushion (S70, S80).

As illustrated, the controller 50 transmits the recline motor output (d) of the seat motor driving control unit 53 to the recline motor 41 and at the same time, transmits the slide motor output (e) to the slide motor 42 with respect to the seat target posture required for getting out of the danger region, which is the matched result in the seat safety map 60, into the safe region.

Accordingly, the recline motor 41 is driven by receiving the recline motor output (d) to generate a rotation force, and the motor rotation force is delivered to the seatback 3B of the seat 3 through the rotation gear (e.g., a spur gear, a bevel bear, a helical gear, or a worm/a worm gear) such that the recline angle of the seatback 3B is small, and the reduction in the recline angle narrows the backrest angle (X) of the seat 3 to closely contact with the passenger's upper body to the seatback 3B to reduce the passenger's movement due to shock, increasing safety.

At the same time, the slide motor 42 is driven by receiving the slide motor output (e) to generate a rotation force, and the motor rotation force is delivered to the seat cushion 3A of the seat 3 through a linear conversion gear (e.g., rack/pinion gears) such that the sliding movement position of the seat cushion 3A increases, and the increase in the sliding movement position further moves the seat 3 forward to closely contract the passenger's lower body to the seat cushion 3A to reduce the passenger's movement due to shock, increasing safety.

As described above, the pre-active safety seat system 10 simultaneously controls the recline motor 41 and the slide motor 42 of the multi-seat motor 40 to minimize the PSS required time, speeding up the arrival of the seat target posture of the seat 3, and as a result, it is proved that the passenger's safety may be reinforced during the PSS operable section (see FIG. 5) in the risk collision situation.

The adjusting of the seat cushion tilt (S90, S100) includes confirming whether a cushion tilt does not satisfy a target (S90) and performing a cushion tilt motor driving control (S100). In the instant case, the confirming of whether the cushion tilt does not satisfy the target (S90) is a value confirmed from the matched result through the seat safety map 60 illustrated in FIG. 6.

Figure 8:
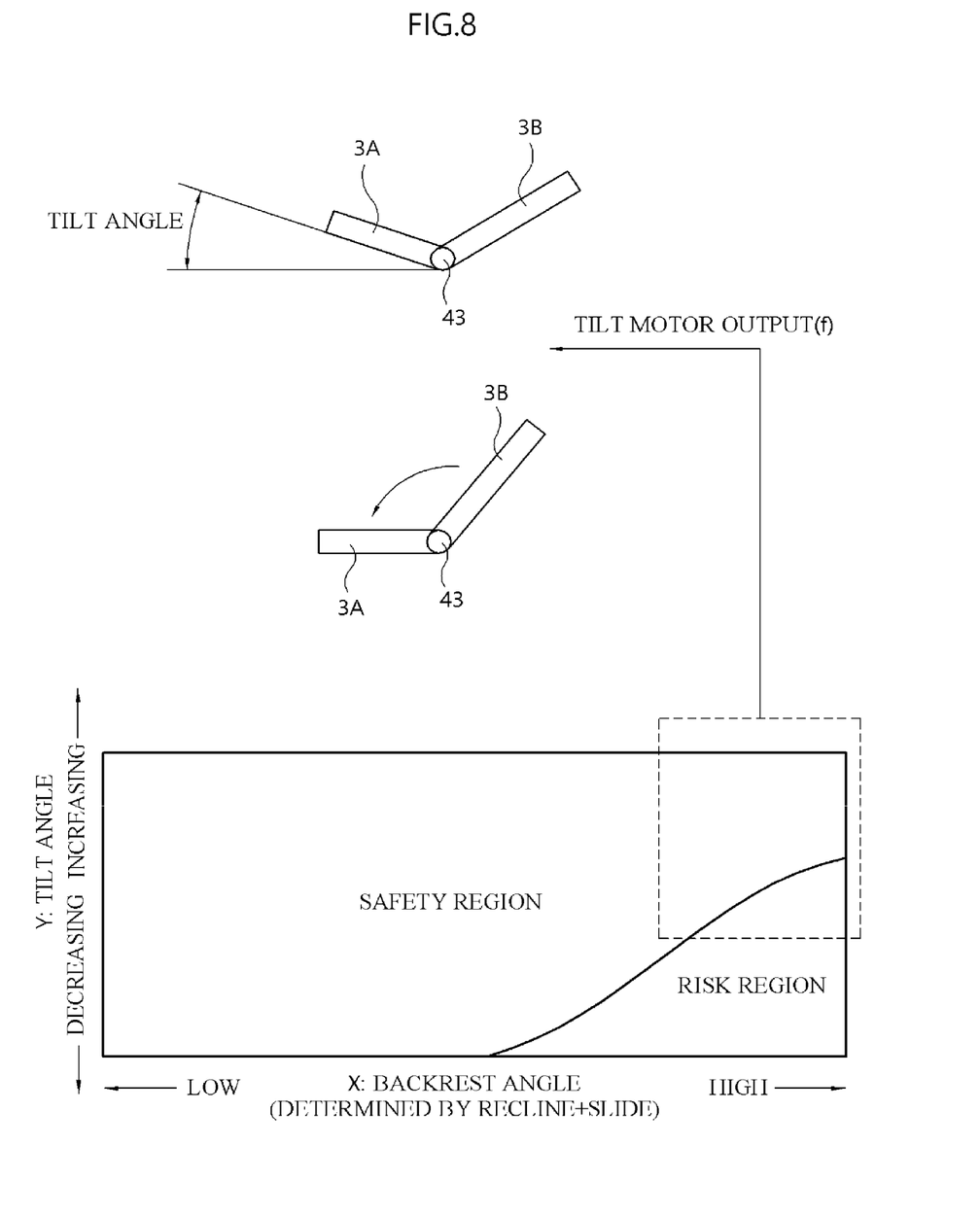
FIG. 8 is a diagram illustrating a cushion tilt angle change state of the pre safety seat using a tilt motor in the PSS required time according to various exemplary embodiments of the present invention.

FIG. 8 illustrates that the controller 50 performs the adjusting of the seat cushion tilt (S90, S100).

As illustrated, the controller 50 transmits the tilt motor output (0 of the seat motor driving control unit 53 to the tilt motor 43 with respect to the seat target posture required for getting out of the danger region, which is the matched result in the seat safety map 60, into the safe region.

Accordingly, the tilt motor 43 is driven by receiving the tilt motor output (0 to generate a rotation force, and the motor rotation force is delivered to the seat cushion 3A of the seat 3 through the rotation gear (e.g., a spur gear, a bevel bear, a helical gear, or a worm/a worm gear) such that the cushion tilt angle of the seat cushion 3A is small, and the reduction in the cushion tilt angle narrows the tilt angle (Y) of the seat 3 to make the passenger's lower body in a lower posture to reduce the passenger's movement due to shock, further increasing safety.

As described above, it is proved that the pre-active safety seat system 10 controls the tilt motor 43 after minimizing the PSS required time by driving the recline motor 41 and the slide motor 42 of the multi-seat motor 40, further reinforcing the passenger's safety during the PSS operable section (see FIG. 5) in the risk collision section.

As described above, the pre-active safety seat system 10 applied to the vehicle 1 according to the exemplary embodiment of the present invention implements the method for improving the pre-active safety seat speed, which confirms the risk region by matching the recline angle, the slide movement position, and the cushion tilt angle, which are detected from each of the plurality of sensors of the multi-seat sensor 30 in the risk collision situation detected by the vehicle environment sensor 20 of the ADAS 9, with the seat safety map 60, and combines and simultaneously controls the plurality of motors of the multi-seat motor 40 for the seat target posture of the seat 3 for converting the risk region into the safety region, by the controller 50, shortening a pre-active safety seat (PSS) required time of the seat target posture in the pre-active safety seat (PSS) operable section before collision from the risk detection.

Furthermore, the term related to a control device such as "controller", "control unit", "control device" or "control module", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The control device according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present invention.

The aforementioned invention can also be embodied as computer readable codes on a computer readable recording medium. The computer readable recording medium is any data storage device that can store data which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet).

In various exemplary embodiments of the present invention, each operation described above may be performed by a control device, and the control device may be configured by a plurality of control devices, or an integrated single control device.

In various exemplary embodiments of the present invention, the control device may be implemented in a form of hardware or software, or may be implemented in a combination of hardware and software.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A pre-active safety seat system for a vehicle, the pre-active safety seat system comprising:
   a vehicle environment sensor configured for detecting risk collision situation information for a neighboring vehicle while the vehicle travels;
   a multi-seat sensor configured for detecting at least one of a recline angle, a slide movement position, and a cushion tilt angle of a seat as a current seat posture of the seat in the vehicle;
   a multi-seat motor coupled to the seat and configured for generating a motor driving force and applying the motor driving force to the seat so that the current seat posture of the seat is changed into a seat target posture by changing at least one of the recline angle, the slide movement position, and the cushion tilt angle of the seat; and
   a controller electrically connected to the vehicle environment sensor, the multi-seat sensor and the multi-seat motor and configured for controlling the motor driving force to adjust the current seat posture of the seat up to the seat target posture in a risk collision situation confirmed by the controller according to the risk collision situation information, wherein the multi-seat sensor includes:
a recline sensor mounted on a seatback of the seat to detect the recline angle; and
a slide sensor mounted on a seat cushion of the seat to detect the slide movement position of the seat cushion, and wherein the controller is configured to simultaneously control the adjusting of the seatback angle and moving of the position of the seat cushion, thereby shortening a pre-active safety seat (PSS) required time of the seat target posture in a PSS operable section before collision of the vehicle from a risk detection.

2. The pre-active safety seat system for the vehicle of claim 1,
wherein the vehicle environment sensor is a component of an advanced driver assistance system (ADAS).

3. The pre-active safety seat system for the vehicle of claim 1,
wherein the multi-seat sensor is mounted on the seat, and
wherein the multi-seat sensor further includes:
a tilt sensor mounted on a connection portion of the seat cushion and the seatback to detect the cushion tilt angle of the seat cushion with respect to the seatback.

4. The pre-active safety seat system for the vehicle of claim 1,
wherein the multi-seat motor is mounted on the seat, and
wherein the multi-seat motor includes:
a recline motor mounted on the seatback of the seat to increase or decrease the recline angle;
a slide motor mounted on the seat cushion of the seat to change the slide movement position; and
a tilt motor mounted on a hinge connection portion of the seat cushion and the seatback to increase or decrease the cushion tilt angle of the seat cushion with respect to the seatback.

5. The pre-active safety seat system for the vehicle of claim 4,
wherein the controller is connected to a seat safety map in which a risk region and a safety region is divided by a backrest angle and a tilt angle of the seat,
wherein the risk region is a region in which the current seat posture is required to be changed into the seat target posture, and
wherein when the controller concludes that the recline angle does not satisfy a target value for the safety region, the controller is configured for changing a tilt angle of the recline angle by driving the recline motor provided on the seat,
wherein when the controller concludes that the slide movement position does not satisfy a target value for the safety region, the controller is configured for moving the slide movement position by driving the slide motor provided on the seat, and
wherein when the controller concludes that the cushion tilt angle does not satisfy a target value for the safety region, the controller is configured for changing a height of the cushion tilt angle by driving the tilt motor provided on the seat.

6. The pre-active safety seat system for the vehicle of claim 1,
wherein the controller is connected to a seat safety map in which a risk region and a safety region is divided by a backrest angle and a tilt angle of the seat, and
wherein the risk region is applied as a matching section in which the current seat posture is required to be changed into the seat target posture.

7. The pre-active safety seat system for the vehicle of claim 6,
wherein the controller is configured to match the cushion tilt angle with the tilt angle while matching the recline angle according to the slide movement position with the backrest angle, and to control the multi-seat motor to generate a motor output to change the current seat posture into the seat target posture as a result of the matching.

8. The pre-active safety seat system for the vehicle of claim 7,
wherein the controller is configured to classify the motor output into a recline motor output for changing the recline angle, a slide motor output for changing the slide movement position, and a tilt motor output for changing the cushion tilt angle.

9. The pre-active safety seat system for the vehicle of claim 8,
wherein the controller simultaneously transmits the recline motor output and the slide motor output to the multi-seat motor.

10. A method for improving a pre-active safety seat speed of a vehicle, the method comprising:
confirming, by a controller, a collision risk situation for a neighboring vehicle detected by an advanced driver assistance system (ADAS) while the vehicle travels;
matching, by the controller, a map which confirms a current seat posture of a seat by matching at least one of a recline angle, a slide movement position, and a cushion tilt angle of the seat detected by a multi-seat sensor provided on the seat with a seat safety map, and confirms the current seat posture as a risk region;
determining, by the controller, a change in at least one of the recline angle, the slide movement position, and the cushion tilt angle of the seat; and
driving, by the controller, a multi-seat motor which is electrically connected to the controller and changes the current seat posture into a seat target posture of a safety region by controlling driving of the multi-seat motor provided on the seat, in a pre-active safety seat (PSS) operable section before collision of the vehicle from a risk detection,
wherein the driving of the multi-seat motor includes:
adjusting a seatback angle which changes a tilt angle of the recline angle; and
moving a position of a seat cushion of the seat, wherein the seat cushion moves the slide movement position, and
wherein the adjusting of the seatback angle and the moving of the position of the seat cushion are simultaneously controlled by the controller, thereby shortening a pre-active safety seat (PSS) required time of the seat target posture.

11. The method of claim 10,
wherein with respect to the seat target posture, the controller is configured to set a posture of the safety region closest to the current seat posture found by analyzing the seat safety map in a state of belonging to the risk region as a target posture.

12. The method of claim 10, wherein the matching of the map includes:
matching the recline angle according to the slide movement position with a backrest angle of the seat safety map; and confirming the risk region and the safety region for the current seat posture as a result of the matching the cushion tilt angle to a tilt angle of the seat safety map.

13. The method of claim 10, wherein the driving of the multi- seat motor further includes:
adjusting a seat cushion tilt which changes a tilt angle of the cushion tilt angle.

14. The method of claim 13,
wherein the multi-seat motor includes a recline motor, and
wherein the adjusting of the seatback angle includes:
confirming whether the recline angle does not satisfy a target value for the safety region; and
when the controller concludes that the recline angle does not satisfy the target value for the safety region, changing, by the controller, a tilt angle of the recline angle by driving the recline motor provided on the seat.

15. The method of claim 13,
wherein the multi-seat motor includes a slide motor, and
wherein the moving of the position of the seat cushion includes:
confirming whether the slide movement position does not satisfy a target value for the safety region; and
when the controller concludes that the slide movement position does not satisfy the target value for the safety region, moving, by the controller, the slide movement position by driving the slide motor provided on the seat.

16. The method of claim 13,
wherein the multi-seat motor includes a tilt motor, and
wherein the adjusting of the seat cushion tilt includes:
confirming whether the cushion tilt angle does not satisfy a target value for the safety region; and
when the controller concludes that the cushion tilt angle does not satisfy the target value for the safety region, changing, by the controller, a height of the cushion tilt angle by driving the tilt motor provided on the seat.

17. A non-transitory computer readable storage medium on which a program for performing the method of claim 10 is recorded.

* * * * *